United States Patent
Sinha et al.

(10) Patent No.: US 9,131,281 B2
(45) Date of Patent: Sep. 8, 2015

(54) METHOD FOR EMBEDDING AND MULTIPLEXING AUDIO METADATA IN A BROADCASTED ANALOG VIDEO STREAM

(71) Applicant: Tata Consultancy Services, Mumbai (IN)

(72) Inventors: Aniruddha Sinha, Kolkata (IN); Arindam Saha, Kolkata (IN); Arpan Pal, Kolkata (IN); Anupam Basu, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 14/369,742

(22) PCT Filed: Dec. 27, 2012

(86) PCT No.: PCT/IN2012/000859
§ 371 (c)(1),
(2) Date: Jun. 30, 2014

(87) PCT Pub. No.: WO2013/105116
PCT Pub. Date: Jul. 18, 2013

(65) Prior Publication Data
US 2014/0359657 A1   Dec. 4, 2014

(30) Foreign Application Priority Data
Dec. 29, 2011 (IN) .......................... 3702/MUM/2011

(51) Int. Cl.
*H04N 7/025* (2006.01)
*H04N 21/81* (2011.01)
*H04N 21/235* (2011.01)
*H04N 21/236* (2011.01)
*H04N 21/2365* (2011.01)
*H04H 20/31* (2008.01)

(52) U.S. Cl.
CPC ......... *H04N 21/8106* (2013.01); *H04N 21/235* (2013.01); *H04N 21/2365* (2013.01); *H04N 21/23614* (2013.01); *H04H 20/31* (2013.01)

(58) Field of Classification Search
CPC ...................................................... H04N 21/81
USPC ............................................................. 725/32
See application file for complete search history.

(56) References Cited

U.S. PATENT DOCUMENTS

| 5,461,619 | A | 10/1995 | Citta et al. |
| 6,357,042 | B2 | 3/2002 | Srinivasan et al. |
| 6,963,590 | B1 | 11/2005 | Mannan et al. |

(Continued)

FOREIGN PATENT DOCUMENTS

| GB | 2359918 | | 9/2001 |
| IN | 2422/MUM/2011 | * | 8/2011 |

(Continued)

*Primary Examiner* — Nasser Goodarzi
*Assistant Examiner* — Michael B Pierorazio
(74) *Attorney, Agent, or Firm* — Finnegan, Henderson, Farabow, Garrett & Dunner L.L.P.

(57) ABSTRACT

A method for embedding, multiplexing and broadcasting of multiple audio metadata in an analog video stream and thereby generating output analog video containing multiple separable audio-video tuples of optimum quality. Further, a user study is performed on a sample tutorial video for various frame rates and resolution to calculate the mean opinion score for deriving the degree of multiplexing that may be provided without deteriorating the quality of video.

8 Claims, 2 Drawing Sheets

(56) References Cited

U.S. PATENT DOCUMENTS

| | | |
|---|---|---|
| 7,359,450 B1 | 4/2008 | Payne et al. |
| 7,555,768 B2 | 6/2009 | Norman |
| 8,023,888 B2 | 9/2011 | Santoru et al. |
| 2002/0118296 A1* | 8/2002 | Schwab et al. ............ 348/441 |
| 2004/0177383 A1 | 9/2004 | Martinolich et al. |
| 2005/0162886 A1* | 7/2005 | Jeong et al. ............... 365/63 |
| 2009/0328088 A1* | 12/2009 | Harris ....................... 725/10 |
| 2010/0157881 A1* | 6/2010 | Santoru et al. ............ 370/317 |
| 2011/0088075 A1 | 4/2011 | Eyer |

FOREIGN PATENT DOCUMENTS

| | | |
|---|---|---|
| WO | WO 2013061337 A2 * | 5/2013 |
| WO | WO 2013105116 A2 * | 7/2013 |

* cited by examiner (a)

(b)

METHOD FOR EMBEDDING AND MULTIPLEXING AUDIO METADATA IN A BROADCASTED ANALOG VIDEO STREAM

PRIORITY CLAIM

This application is a National Stage Entry of International Application No. PCT/IN2012/000859, filed Dec. 27, 2012, which claims priority from Indian Patent Application No. 3702/MUM/2011, filed Dec. 29, 2011. The entire contents of the above-referenced applications are expressly incorporated herein by reference for all purposes.

FIELD OF THE INVENTION

The invention generally relates to the field of television broadcasting. More particularly, the invention relates to a method for embedding metadata specifically multiple digital audio, multiple tutorials and related question answers in multiplexed videos broadcasted in an analog domain through digital broadcasting medium.

The present invention is an improvement of the invention described and claimed in an earlier Indian Patent Application no. 2422/MUM/2011 which is further filed as a PCT application No. PCT/IN2012/000562.

BACKGROUND

One of the major challenges in television broadcasting lies in sharing content such as an audio-visual content and associated metadata with remotely located individual viewers. The broadcasted content is first compressed and then broadcasted from a television broadcasting station that may then be received by antennas employed by individual users. Such stations transmit multiple audio-visual contents broadcasted by various broadcasting channels on the television sets located worldwide that displays the contents on TV display screen.

With the enhancement of technology related to content broadcasting methods and ubiquitous presence of television sets across the world and specifically in developing and under developed countries, there has been an enhancement in utilization of television for interactive applications such as online gaming, distance-learning and online chatting etc. These applications supported by the television broadcast have resulted in the concept of "Interactive TV".

The significance of "Interactive TV" has been accepted by all the sections of the society including the service providers, the customers and the government agencies. Therefore, there was a need in the art to enable a television broadcasting system that supports interactive applications as desired by the consumer at his or her home using the television as a medium for accessing various interactive applications.

However, as can be observed, the present broadcasting scenario is limited to transmit conventional audio, video, PSI and SI data only. Further, the data type associated with interactive applications may not be enabled to transfer using existing broadcasting infrastructure. Moreover, if the data type is other than the conventional audio, video, PSI and SI data then the data of such data type may not be transmitted using the existing broadcasting infrastructure. Hence, there is a need to enable system for transferring any other data type along with the conventional data type supported for transmission.

In the background art, a PCM Adaptor is known to enable embedding of raw audio data into a video frame. Also, there are systems known in the art embedding teletext and closed captions in the lines of vertical blanking interval (VBI) as disclosed in the CEA-608 standard. Further, there exist various systems to transmit digitally encoded bits in the VBI (vertical blanking interval) wherein, 7175 bits per second per line can be transmitted. However, there is a limit for the number of VBI lines which is of the order of 20-40 lines. Moreover, at the receiver end, for decoding the embedded data of different types using the existing systems requires the support for specialized hardware devices. The VBI lines contain teletext, closed captions and electronic program guide (EPG). Hence, there is a limit for number of free lines available to send new type of data.

Moreover, along with the audio-visual content certain metadata is also required to be embedded in the transmitted analog signal. The solutions provided by the existing technology are unable to provide a method for embedding the related metadata in a transmitted signal that is robust enough to sustain video compression and digital to analog conversions in the digital TV broadcast. Further, multiplexing multiple tutorials along with audio is not possible in a single analog TV channel. The Indian Patent Application no. 2422/MUM/2011 describes a solution for embedding metadata such as tutorial related Question-Answer and other related data in the analog video signal. The prior filed Indian Patent Application also describes transmitting tutorial information and associated metadata of the tutorials and the EPG in a single analog video channel along with the normal video. All these metadata are multiplexed as part of the pixels in the video frame.

However, in addition to there is a need for a method for embedding metadata specifically multiple encoded digital audio channels, question-answer (QA) and other related data as part of the analog video. The need is to make the metadata embedding method robust enough to sustain video compression and digital to analog conversions in the digital TV broadcast.

In view of the above lacunae observed in the background art, there is a long-felt need for a method for multiplexing several tutorials in a single analog channel by multiplexing multiple video channels in a single video channel and multiplexing and embedding multiple encoded digital audio and other related data, termed as metadata as part of the analog video. Further requirement is to make the metadata embedding method robust enough to sustain video compression and digital to analog conversions in the digital TV broadcast and to provide a superior user experience.

OBJECTIVES OF THE APPLICATION

It is the primary objective of the present application to provide a method for multiplexing multiple video streams along with respective multiple encoded digital audio and Question Answers in a single analog video channel.

It is another objective of the application to provide a method for embedding multiple digital audio in analog video frame and thereupon multiplexing multiple tutorials (video and audio) and also providing better user experience.

SUMMARY OF THE INVENTION

Before the present methods, systems, and hardware enablement are described, it is to be understood that this invention in not limited to the particular systems, and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention which will be limited only by the appended claims.

In an embodiment, a method for embedding and broadcasting audio metadata in an analog video stream is provided. In an aspect, the analog video stream may be a tutorial consisting of audio and video. The aim is to multiplex multiple tutorials. The corresponding multiple encoded digital audio parts are multiplexed and embedded in the form of metadata. Such a method utilizes the technique as described in the prior filed patent application 2422/MUM/2011. The method further involves generating at least one audio data bit and at least one audio pilot bit related to the said audio metadata. The audio data bit is then converted into at least one audio data symbol and the audio pilot bit is converted into at least one audio pilot symbol. Such audio data symbol and audio pilot symbol are then embedded into at least one first set of video pixels of said analog video stream to form at least one first set of audio data pixels. Thereupon, the first set of one second audio data pixels with at least one second set of video pixels of the analog video stream is multiplexed to generate at least one set of 25 fps and 6 Mbps MPEG2 stream. The audio pilot symbol is, then detected in the multiplexed video pixels at a receiver by matching the stored threshold auto-correlated value of the audio pilot symbol using a matched filter. The audio data symbol is extracted from corresponding detected audio pilot symbol from the first set of audio data pixels in the multiplexed video pixels. The audio data bit is retrieved from the extracted audio data symbol. Finally, the audio metadata corresponding to the retrieved audio data bit is obtained and the second set of video pixels from the multiplexed video pixels is retrieved. The said process results in a high quality audio-video output that equals to VGA at 25 fps and 6 Mbps MPEG2 stream.

BRIEF DESCRIPTION OF THE DRAWINGS

The foregoing summary, as well as the following detailed description of preferred embodiments, are better understood when read in conjunction with the appended drawings. For the purpose of illustrating the invention, there is shown in the drawings exemplary constructions of the invention; however, the invention is not limited to the specific methods and system disclosed. In the drawings.

DETAILED DESCRIPTION OF THE INVENTION

Some embodiments of this invention, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

The disclosed embodiments are merely exemplary of the invention, which may be embodied in various forms.

Temporal and spatial multiplexing of audio-video content is done to broadcast multiple audio-video streams simultaneously in a single channel. The temporal multiplexing is achieved by reducing the frame rate and spatial multiplexing is achieved by reducing the resolution (width×height) of the video frames. Hence the degree of multiplexing is inversely proportional to the quality of the video.

Figure 1:
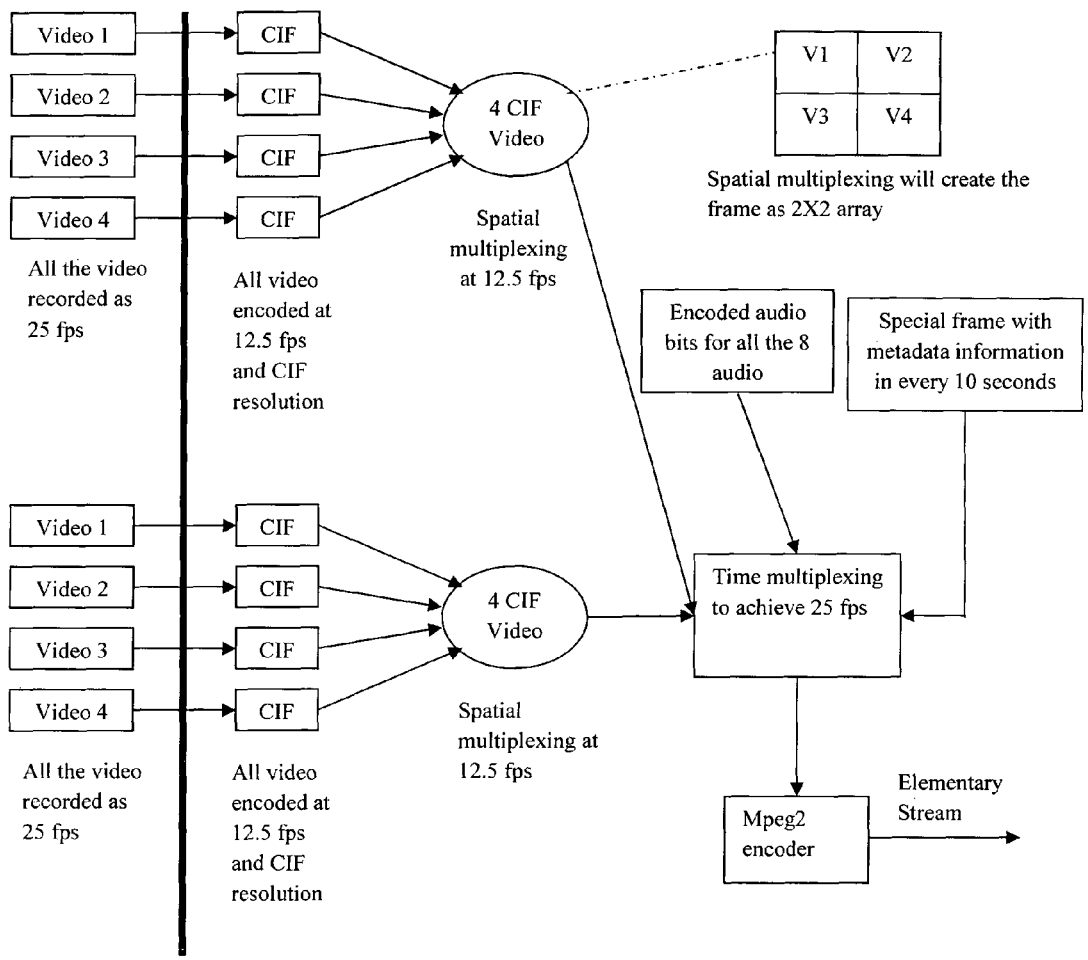
FIG. 1 illustrates block diagram for multiplexing multiple tutorials.

FIG. 1 describes block diagram for multiplexing multiple tutorials in accordance with an embodiment. Tutorials consist of audio and video. The corresponding multiple encoded digital audio parts are multiplexed and embedded in the form of metadata in the analog video stream. The method for embedding and broadcasting audio metadata in an analog video stream is provided. Such a method utilizes the technique as described in the prior filed patent application 2422/MUM/2011. Multiple set of audio data is embedded in every second of video. For example, if there are 8 tutorials then 8 sets of audio data are embedded in per second video. Similarly there are 8 sets of video data (of the tutorial) also embedded in 1 second using video multiplexing technique. The method further involves generating at least one audio data bit and at least one audio pilot bit related to the said audio metadata. The audio data bit is then converted into at least one audio data symbol and the audio pilot bit is converted into at least one audio pilot symbol. Such audio data symbol and audio pilot symbol are then embedded into at least one first set of video pixels of said analog video stream to form at least one first set of audio data pixels. Thereupon, the first set of one second audio data pixels with at least one second set of video pixels of the analog video stream is multiplexed to generate at least one set of 25 fps and 6 Mbps MPEG2 stream. The audio pilot symbol is then detected in the multiplexed video pixels at a receiver by matching the stored threshold auto-correlated value of the audio pilot symbol using a matched filter. The audio data symbol is extracted from corresponding detected audio pilot symbol from the first set of audio data pixels in the multiplexed video pixels. The audio data bit is retrieved from the extracted audio data symbol. Finally, the audio metadata corresponding to the retrieved audio data bit is obtained and the second set of video pixels from the multiplexed video pixels is retrieved. The said process results in a high quality audio-video output that equals to VGA at 25 fps and 6 Mbps MPEG2 stream. Further, FIG. 1 describes a video encoded to QVGA resolution is encoded to 12.5 fps streams and finally two such streams multiplexed together to make final stream of 25 fps. So totally 4*2=8 tutorials can be simultaneously multiplexed within one channel as shown in the figure and encoded with a standard video encoder. Such a multiplexed stream has one special frame in every 10 second.

Figure 2:
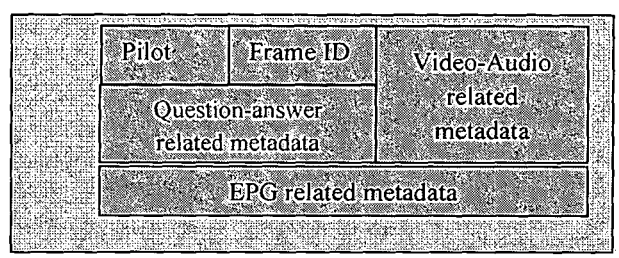
FIG. 2 illustrates the spatial layout for the special frame and the normal video frame.
Figure 2:
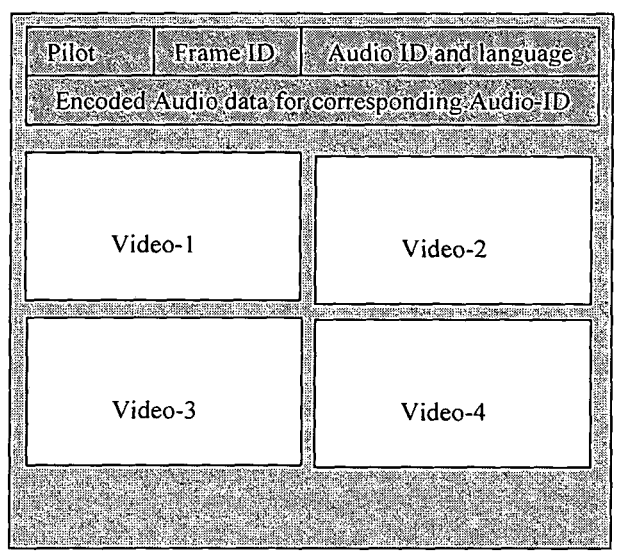

FIG. 2 illustrates the spatial layout for the special frame and the normal video frame. Multiple videos are spatially and temporally multiplexed using prior filed patent application 2422/MUM/2011. Corresponding multiple audios are embedded using the audio ID as shown in the figure. In order to create the complete package for the tutorials, pilot bits, metadata, video and audio are inserted in hierarchical manner. The special frame contains the pilot pattern, frame ID, video-audio related metadata, Q&A related metadata and EPG related data as shown in FIG. 2(a). The normal frames in a Group of Pictures contain audio and video data. Each such frame contains the pilot pattern, frame ID, audio and its language ID, audio data and video data as shown in FIG. 2(b).

Further, a method for optimizing the quality of multiplexed video content with embedded audio data is also provided. Tradeoff between bandwidth requirement and the user experience can be achieved using a cost function which is a combination of the above two. Assuming that the video quality of the broadcast is Q, the time duration for the broadcast (D) and the user experience (UExp), then the objective function J needs to be maximized.

$$J = alpha * UExp - beta * Q * D \quad (1)$$

Where alpha and beta are selection parameter.

In order to achieve a given user experience the video quality needs to be set such that the J is maximized.

The quality Q of the video is dependent on the encoding resolution and frame-rate and hence directly related to the bandwidth consumed by the video. The optimum point for the MOS vs BW is approximately at 1 Mbps with MOS score as 3.75. Beyond this point the gain in MOS decreases for a given increase in BW.

The broadcaster can use the above data to select a bandwidth required to transmit a tutorial based on the amount a user is ready to pay.

The illustrations of arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

The preceding description has been presented with reference to various embodiments of the invention. Persons skilled in the art and technology to which this invention pertains will appreciate that alterations and changes in the described structures and methods of operation can be practiced without meaningfully departing from the principle, spirit and scope of this invention.

We claim:

1. A method for multiplexing and broadcasting a plurality of video streams by embedding one or more digital audio parts in at least one video stream of the plurality of video streams, the method comprising:
   receiving a plurality of sets of spatially multiplexed video streams, wherein a frame rate of each video stream of the plurality of sets of spatially multiplexed video streams is reduced to half of an original frame rate;
   generating an audio data bit and an audio pilot bit using metadata associated with one or more digital audio parts;
   converting the audio data bit into an audio data symbol and the audio pilot bit into an audio pilot symbol;
   embedding the audio data symbol and the audio pilot symbol into a video frame of a video stream of the plurality of sets of spatially multiplexed video streams;
   embedding each digital audio part into respective video streams of the plurality of sets of spatially multiplexed video streams, wherein each digital audio part, corresponding to a respective video stream, is to be retrieved at a receiving device using the audio data symbol and the audio pilot symbol;
   multiplexing, in a temporal domain, the plurality of sets of spatially multiplexed video streams comprising the one or more digital audio parts, the audio data symbol and the audio pilot symbol, so embedded, to generate an elementary video stream thereby achieving the original frame rate; and
   broadcasting the elementary video stream via a single video channel.

2. The method of claim 1, wherein the elementary video stream comprises a 25 fps and 6 Mbps MPEG2 stream.

3. The method of claim 1, wherein the plurality of sets of spatially multiplexed video streams comprise analog video streams.

4. A method for retrieving an elementary video stream comprising one or more digital audio data parts, the method comprising:
   detecting an audio pilot symbol in a video frame of the elementary video stream at a receiver by matching a stored threshold auto-correlated value of the audio pilot symbol using a matched filter;
   extracting an audio data symbol corresponding to the detected audio pilot symbol from the video frame;
   retrieving an audio data bit from the audio data symbol so extracted;
   obtaining metadata associated with one or more digital audio parts corresponding to the audio data bit so retrieved from the video frame; and
   obtaining a plurality of video streams and the one or more digital audio parts from the elementary video stream using the metadata.

5. A system for multiplexing and broadcasting a plurality of video streams by embedding one or more digital audio parts in at least one video stream of the plurality of video streams, the system comprising:
   one or more hardware processors; and
   one or more memory units storing processor-executable instructions for:
   receiving a plurality of sets of spatially multiplexed video streams, wherein a frame rate of each video stream of the plurality of sets of spatially multiplexed video streams is reduced to half of an original frame rate;
   generating an audio data bit and an audio pilot bit using metadata associated with one or more digital audio parts;
   converting the audio data bit into an audio data symbol and the audio pilot bit into an audio pilot symbol;
   embedding the audio data symbol and the audio pilot symbol into a video frame of a video stream of the plurality of sets of spatially multiplexed video streams;
   embedding each digital audio part into respective video streams of the plurality of sets of spatially multiplexed video streams, wherein each digital audio part, corresponding to a respective video stream, is to be retrieved at a receiving device using the audio data symbol and the audio pilot symbol;
   multiplexing, in a temporal domain, the plurality of sets of spatially multiplexed video streams comprising the one or more digital audio parts, the audio data symbol and the audio pilot symbol, so embedded, to generate an elementary video stream thereby achieving the original frame rate; and
   broadcasting the elementary video stream via a single video channel.

6. A system for retrieving an elementary video stream comprising one or more digital audio data parts embedded therein, the system comprising:
   one or more hardware processors; and
   one or more memory units storing processor-executable instructions for:

detecting an audio pilot symbol in a video frame of the elementary video stream at a receiver by matching a stored threshold auto-correlated value of the audio pilot symbol using a matched filter;

extracting an audio data symbol corresponding to the detected audio pilot symbol from a video frame;

retrieving an audio data bit from the audio data symbol so extracted;

obtaining metadata associated with one or more digital audio parts corresponding to the audio data bit so retrieved from the video frame; and obtaining a plurality of video streams and the one or more digital audio parts from the elementary video stream using the metadata.

7. A non-transitory computer-readable medium storing processor-executable instructions for multiplexing and broadcasting a plurality of video streams by embedding one or more digital audio parts in at least one video stream of the plurality of video streams, the processor-executable instructions comprising instructions for:

receiving a plurality of sets of spatially multiplexed video streams, wherein a frame rate of each video stream of the plurality of sets of spatially multiplexed video streams is reduced to half of an original frame rate;

generating an audio data bit and a audio pilot bit using metadata associated with one or more digital audio parts;

converting the audio data bit into an audio data symbol and the audio pilot bit into an audio pilot symbol;

embedding the audio data symbol and the audio pilot symbol into a video frame of a video stream of a video stream of the plurality of sets of spatially multiplexed video streams;

embedding each digital audio part into respective video streams of the plurality of sets of spatially multiplexed video streams, wherein each digital audio part, corresponding to a respective video stream, is to be retrieved at a receiving device using the audio data symbol and the audio pilot symbol;

multiplexing, in a temporal domain, the plurality of sets of spatially multiplexed video streams comprising the one or more digital audio parts, the audio data symbol and the audio pilot symbol so embedded, to generate an elementary video stream thereby achieving the original frame rate; and broadcasting the elementary video stream via a single video channel.

8. A non-transitory computer-readable medium storing processor-executable instructions for retrieving an elementary video stream comprising one or more digital audio data parts embedded therein, the processor-executable instructions comprising instructions for:

detecting an audio pilot symbol in a video frame of the elementary video stream at a receiver by matching a stored threshold auto-correlated value of the audio pilot symbol using a matched filter;

extracting an audio data symbol corresponding to the detected audio pilot symbol from the video frame;

retrieving an audio data bit from the audio data symbol so extracted;

obtaining metadata associated with one or more digital audio parts corresponding to the audio data bit so retrieved from the video frame; and obtaining a plurality of video streams and the one or more digital audio parts from the elementary video stream using the metadata.

* * * * *